United States Patent [19]
Takeuchi et al.

[11] 4,433,107
[45] Feb. 21, 1984

[54] POLYISOPRENE RUBBER COMPOSITIONS

[75] Inventors: Yasumasa Takeuchi; Mitsuhiko Sakakibara; Nobuo Tagata, all of Yokkaichi; Masaki Ogawa, Sayama; Yasushi Hirata, Higashimurayama; Shigeru Tomihira, Kodaira, all of Japan

[73] Assignee: Bridgestone Tire Co., Ltd.

[21] Appl. No.: 404,750

[22] Filed: Aug. 3, 1982

[30] Foreign Application Priority Data

Aug. 19, 1981 [JP] Japan .................. 56-128779

[51] Int. Cl.³ .............................................. C08L 9/00
[52] U.S. Cl. .................................... 525/232; 525/210; 525/213; 525/233; 525/235; 525/236; 525/237

[58] Field of Search .............. 525/236, 237, 210, 213, 525/232, 233, 235

[56] References Cited

U.S. PATENT DOCUMENTS 4,119,588 10/1978 Carpino .............................. 525/237

Primary Examiner—J. Ziegler
Attorney, Agent, or Firm—Sughrue, Mion, Zinn, Macpeak & Seas

[57] ABSTRACT

A rubber composition having improved cut growth resistance, processability and dimensional stability is disclosed, which comprises not less than 20 parts by weight of polyisoprene having a melting point of not less than 10° C. and a content of cis-1,4 bond of not less than 88% and the balance of at least one diene rubber.

7 Claims, No Drawings

POLYISOPRENE RUBBER COMPOSITIONS

This invention relates to rubber compositions having improved cut growth resistance, processability and dimensional stability which contain polyisoprene having a specified melting point and less gel (branching).

Natural rubber is widely used in various industrial goods such as tires and the like because of its excellent properties. However, the natural rubber has such drawbacks that the plasticity is low, the preliminary treatment such as warming-up, mastication or the like is required before the kneading, and when the molding speed exceeds a certain level in the extrusion molding or calendering, the die swell rapidly occurs and the shape stability is deteriorated.

On the other hand, commercially available polyisoprene rubbers do not take the preliminary treatment as in the natural rubber, but have drawbacks that the viscosity in the processing is very high and also the heat generation in the processing is large. Furthermore, the crack propagation resistance is fairly poor, so that the polyisoprene rubber is naturally restricted in use and also the blending ratio thereof is restrained low as compared with the case of the natural rubber.

The inventors have made various studies in order to improve the above mentioned drawbacks of the conventional polyisoprene and natural rubbers and found that polyisoprene having particular molecular properties has no need of the preliminary treatment as in the natural rubber, is good in the processability as compared with the natural rubber, excellent in the dimensional stability and superior in the cut growth resistance to the conventional polyisoprene and gives a rubber composition having well-balanced properties, and as a result the invention has been accomplished.

It is, therefore, an object of the invention to provide a curable rubber composition containing polyisoprene with a less branching and a specified melting point and having improved cut growth resistance, processability and dimensional stability as compared with the natural rubber.

According to the invention, there is the provision of a rubber composition having improved cut growth resistance, processability and dimensional stability, comprising not less than 20 parts by weight of polyisoprene having a melting point of not less than 10° C. and a content of cis-1,4 bond of not less than 88% and the balance of at least one diene rubber.

The melting point of polyisoprene defined in the invention is measured by means of a differential scanning calorimeter (DSC) as follows. That is, 18 mg of polyisoprene sample obtained by reprecipitating, purifying and thoroughly drying polyisoprene is placed on an aluminum dish in DSC apparatus made by Rigaku Corporation, retained at $-17°$ C. for 22 hours and then the temperature was raised at a rate of 20° C./min, during which an endothermic peak temperature is measured as a melting point. Moreover, the temperature correction of this apparatus is performed by using indium and water as a reference substance.

The insoluble matter of polyisoprene in tetrahydrofuran (gel) defined in the invention is measured as follows. That is, 0.1 g of polyisoprene is added to 100 ml of tetrahydrofuran and left to stand in a dark room over 24 hours. Then, the resulting solution is separated in a centrifugal separator (made by Sakuma Seisakusho) at 14,000 rpm for 1 hour and the separated polyisoprene solution is further filtered under pressure through a filter of $0.5\mu$ millipore (made by Nippon Millipore Limited). Thereafter, the residues recovered from the centrifugal separator and filter are dried under vacuum together to measure the tetrahydrofuran insoluble matter of the polyisoprene sample (% by weight).

The polyisoprene having the specified melting point (Tm) and the content of cis-1,4 bond of not less than 88% according to the invention (hereinafter abbreviated as HM-IR) can be produced, for example, by polymerizing isoprene in the presence of a catalyst consisting of a combination of a compound of lanthanum series rare earth element (hereinafter referred to as Ln compound), an organoaluminum compound and Lewis acid and/or Lewis base. Furthermore, the polyisoprene according to the invention (HM-IR) includes a polyisoprene mixture having Tm of not less than 10° C. obtained by uniformly mixing polyisoprene polymerized in the presence of a lanthanum series rare earth element catalyst with the other polyisoprene at a state near the order of molecule.

As the Ln compound, there are used compounds having a general formula of $LnY_3$, wherein Ln represents a metal having an atomic number of 57–71 and Y represents a halogen atom, a carboxyl group, an alkoxy group, a thioalkoxy group, an amido group or the like.

As the organoaluminum compound, there are used ones having a general formula of $AlR_1R_2R_3$, wherein $R_1$, $R_2$ and $R_3$ are the same or different and represent a hydrogen atom or a hydrocarbon residue having a carbon atom of 1–8, respectively.

As the Lewis acid, there are used aluminum halides having a general formula of $AlR_nX_{3-n}$, wherein X is a halogen atom, R is a hydrocarbon residue and n is 0, 1, 1.5 or 2 and/or the other metal halides.

The Lewis base is used for solubilizing the Ln compound in an organic solvent. For instance, ketone, acetylacetone, alcohol, pyridine and the like are preferably used.

The mole ratio of isoprene to Ln compound is $5\times10^2-5\times10^7$, preferably $10^3-10^5$.

The mole ratio of $AlR_1R_2R_3$ to Ln compound is 5–500, preferably 10–300.

The mole ratio of halide in Lewis acid to Ln compound is 1–10, preferably 1.5–5.

The mole ratio of Lewis base to Ln compound is not less than 0.5, preferably 1–20.

According to the invention, the polyisoprene (HM-IR) has a melting point (Tm) of not less than 10° C., preferably not less than 15° C., more particularly not less than 20° C. as measured by DSC. The upper limit of Tm is restricted by the nature of the polymer, which is approximately 40° C. When Tm is less than 10° C., the effect of improving the cut growth resistance, processability and dimensional stability cannot be obtained. Tm is considered to reflect chain length of cis-1,4 bond, so that the chain length of cis-1,4 bond is preferably longer than that of the conventional polyisoprene and natural rubber. For this end, the content of cis-1,4 bond should be not less than 88%. When the content of cis-1,4 bond is less than 88%, the chain length of cis-1,4 bond becomes short, Tm lowers or is not observed, and the cut growth resistance is not improved.

According to the invention, it is favorable that the tetrahydrofuran insoluble matter of polyisoprene is not more than 5% by weight. When the insoluble matter exceeds 5%, the processability is deteriorated and also Tm is lowered.

The polyisoprene (HM-IR) according to the invention is small in the viscosity under a shearing stress as compared with the commercially available polyisoprene or natural rubber, so that the processing thereof is considerably easy and the processing energy becomes small and consequently HM-IR is very favorable in rubber industry. This fact is proved by the fact that HM-IR according to the invention is small in the pressure loss ($\Delta P$ in) measured by a capillary rheometer as compared with the commercially available polyisoprene or natural rubber, which shows a large elastic element and a small viscid element.

In the rubber composition according to the invention, the blending amount of HM-IR is not less than 20 parts by weight, preferably 30 to 90 parts by weight based on 100 parts by weight of rubber content. When the amount of HM-IR is less than 20 parts by weight, the effect aimed at the invention cannot be achieved. Moreover, when the amount of HM-IR exceeds 90 parts by weight, the green strength is insufficient as a replacement for natural rubber.

As the diene rubber to be blended with HM-IR according to the invention, use may be made of natural rubber, commercially available polyisoprene rubber, styrene-butadiene copolymer rubber, polybutadiene rubber, ethylene-propylene copolymer rubber, ethylene-propylene-diene terpolymer rubber, acrylonitrile-butadiene copolymer rubber, butyl rubber, halogenated butyl rubber and the like. The mixing of these ingredients forming the rubber composition is carried out by using a roll mill, Banbury mixer, extruder or the like in the conventional manner.

As an additive for rubber, there may be added at least one substance selected from carbon black, calcium carbonate, magnesium carbonate, talc, iron oxide, silicic anhydride, bentonite, zinc white, diatomaceous earth, china clay, clay, alumina, titanium oxide and the like. Furthermore, a vulcanizing agent, an extender oil, an antioxidant and the like usually used in rubber industry may be compounded with the rubber composition according to the invention.

The rubber compositions according to the invention are excellent in the cut growth resistance, processability and dimensional stability, so that they can widely be used in industrial goods such as tires, conveyor belts, hoses and the like.

The following examples are given in illustration of the invention and are not intended as limitations thereof.

EXAMPLES 1-2, COMPARATIVE EXAMPLES 1-3

A rubber composition having a compounding recipe shown in the following Table 1 was cured under curing conditions of 145° C.×2 min to form a vulcanizate shown in the following Table 2. Then, the properties of the resulting vulcanizate were measured to obtain results as shown in Table 2. From the results of Table 2, it is understood that the polyisoprene according to the invention (HM-IR) is small in the heat generation during the processing, low in the die swell, good in the extruded shape, and excellent in the cut growth resistance.

The HM-IR(1) and HM-IR(2) according to the invention shown in Table 2 were produced by the following method. HM-IR(1):

Into a glass autoclave of 5 l capacity dried and purged with nitrogen were charged 2.5 kg of cyclohexane and 500 g of isoprene in a nitrogen atmosphere. Separately, a cyclohexane-soluble reaction product consisting of 0.5 mM of neodymium octenoate and 1 mM of acetylacetone was mixed with 15 mM of triethylaluminum and 1.25 mM of diethylaluminum monochloride and aged in the presence of 2.5 g of isoprene monomer to form a catalyst. The resulting catalyst was charged into the autoclave and then the polymerization was conducted at 60° C. for 3 hours. The degree of conversion was 98%. A methanol solution containing 3 g of 2,6-di-tert-butyl-p-cresol was poured into the autoclave to stop polymerization reaction. Thereafter, the resulting polymer was subjected to steam stripping in the conventional manner and dried in a vacuum drier at 50° C.

HM-IR(2):

This polymer was produced in the same manner as described in the production of HM-IR(1) except that 1 mM of tetrahydrofuran was used instead of acetylacetone.

TABLE 1

|  | Parts by weight |
|---|---|
| Polymer | 100 |
| Carbon black HAF | 50 |
| Stearic acid | 2 |
| Zinc white | 3 |
| Antioxidant 810NA | 1 |
| Vulcanization accelerator TP | 0.8 |
| Vulcanization accelerator DPG | 0.6 |
| Vulcanization accelerator DM | 1.2 |
| Sulfur | 1.5 |

TABLE 2

|  | Example | | Comparative Example | | |
|---|---|---|---|---|---|
|  | 1 | 2 | 1 | 2 | 3 |
| Polymer | HM-IR(1) | HM-IR(2) | IR2200 *1 | RSS#1 *2 | Cariflex 305 *3 |
| Content of cis-1,4 bond *4 (%) | 94 | 96 | 97 | 100 | 86 |
| Melting point (°C.) | 28 | 30 | 4 | 7 | none |
| Tetrahydrofuran insoluble matter (%) | 1.1 | 0.9 | 22 | 58 | 0.9 |
| Final processing temperature *5 (°C.) | 115 | 114 | 124 | 123 | 125 |
| Properties of vulcanizate Mooney viscosity $(ML_{1+4}^{100})$ | 58 | 57 | 56 | 51.5 | 66 |
| $M_{300}$ *6 | 139 | 142 | 130 | 170 | 113 |
| $T_B$ *6 | 311 | 316 | 300 | 310 | 210 |
| $R_b$ at 80° C. *6 (%) | 79 | 79 | 71 | 76 | 75 |
| Heat generation $\Delta T$ *7 (°C.) | 15 | 15 | 17 | 16 | 17 |
| Cut growth | 295 | 315 | 100 | 290 | 40 |

TABLE 2-continued

|  | Example | | Comparative Example | | |
|---|---|---|---|---|---|
|  | 1 | 2 | 1 | 2 | 3 |
| resistance *8 (index) | | | | | |
| ΔPin *9 (kg/cm$^2$) | | | | | |
| log γ = 1.2 | 18 | 17 | 23 | 28 | — |
| = 2.2 | 32 | 31 | 39 | 53 | — |
| = 2.8 | 50 | 52 | 67 | 104 | — |
| = 3.5 | 92 | 91 | 132 | 298 | — |
| Die swell *10 (index) | | | | | |
| log γ = 2.2 | 90 | 85 | 100 | 155 | — |
| = 3.5 | 60 | 55 | 100 | 170 | — |
| Evaluation of shape *11 | | | | | |
| log γ = 2.2 | 9 | 9 | 8.5 | 6.5 | — |
| = 3.5 | 9 | 9 | 7 | 3.0 | — |

(Note)
*1: polyisoprene rubber polymerized in the presence of titanium catalyst, made by Japan Synthetic Rubber Co., Ltd.
*2: natural rubber
*3: polyisoprene rubber polymerized in the presence of lithium catalyst, made by Shell Corp.
*4: value measured by NMR method
*5: dump-out temperature after kneaded in Banbury mixer for 4¼ minutes
*6: measured according to a method of JIS K6301
$M_{300}$: 300% tensile stress
$T_B$: tensile strength
$R_b$: resilience measured by Dunlop tripsometer
*7: value measured by Goodrich flexometer
*8: The cut growth resistance was measured by forming a crack of 0.3 mm length in a center of a test piece having a size of 60 mm × 100 mm × 10 mm and giving a stretching strain to the test piece under conditions of vibration number of 300 cycles/min and strain of 50%. In this case, a time till crack grows to 20 mm is expressed by an index on a basis that Comparative Example 1 is 100.
*9: ΔPin is a pressure loss in an inlet portion of a die as measured at 110° C. by a capillary rheometer. In this case, a capillary having a diameter of 3.5 mm was introduced at an angle of 90° and then a pressure at extrusion piston head was measured by a load cell located on an upper part of an extrusion head as a function of L/D need capillary die. The pressure loss is obtained by extrapolation of the measured value to L/D = 0. γ is a shear rate (sec$^{-1}$).
*10: The die swell was measured by a slit die rheometer (described in Japanese Patent Laid-Open No. 45,430/82) and expressed by an index on a basis that Comparative Example 1 is 100. The die swell is an indication of processability and dimensional stability. The smaller the index value, the better the property.
*11: The evaluation of shape (extruded composition using the slit die rheometer) was measured by eye measurement. A total value measured to the section, surface smoothness and sharpness of corner edge of the test piece was determined by three point method. The larger the value, the better the property.

EXAMPLES 3-6, COMPARATIVE EXAMPLES 4-6

The properties of cured rubber compositions were measured in the same manner as described in Example 1 by changing the kind and blending ratio of the diene rubber to the polyisoprene according to the invention and the curing time to obtain results as shown in the following Table 3.

EXAMPLES 7-8

Two polyisoprene samples were produced by mixing HM-IR(2) of Example 2 with a polyisoprene rubber polymerized in the presence of a titanium catalyst [polymerization at 30° C. in the presence of titanium trichloride/triisobutylaluminum/2-ethylhexylether catalyst under conditions of isoprene/Ti=1,500 (mole ratio), Al/Ti=0.95 (mole ratio), ether/Al=0.2 (mole TABLE 3(a)

|  | Example 3 | Example 4 | Example 5 | Example 6 | Comparative Example 4 | Comparative Example 5 | Comparative Example 6 |
|---|---|---|---|---|---|---|---|
| HM-IR(1) | 80 | 50 | 25 | 50 | 10 | | |
| SBR#1500 *1 | 20 | 50 | 75 | | 90 | 50 | |
| IR2200 | | | | | | 50 | 50 |
| BR01 *2 | | | | 50 | | | 50 |
| Properties of vulcanizate | | | | | | | |
| $M_{300}$ | 144 | 150 | 153 | 138 | 158 | 145 | 137 |
| $T_B$ | 294 | 278 | 277 | 245 | 276 | 277 | 234 |
| $R_b$ (%) | | | | | | | |
| room temperature | 68 | 65 | 64 | 76 | 63 | 63 | 72 |
| 50° C. | 73 | 72 | 72 | 78 | 71 | 70 | 76 |
| Heat generation ΔT(°C.) | 19 | 20 | 20 | 17 | 20 | 22 | 17 |
| Cut growth resistance *3(index) | 210 | 160 | 120 | 160 | 60 | 100 | 80 |
| Evaluation of shape | | | | | | | |
| log γ = 2.2 | 9 | 8.5 | 8.5 | 8 | 7 | 7.5 | 6.5 |
| =3.5 | 9 | 8.5 | 8.0 | 7.5 | 5.5 | 6 | 5.5 |
| Die swell (index) | | | | | | | |
| log γ = 2.2 | 75 | 81 | 89 | 86 | 110 | 100 | 103 |
| =3.5 | 65 | 67 | 70 | 100 | 120 | 100 | 126 |
| Curing time (min) | 10 | 15 | 25 | 30 | 10 | 15 | 10 |

Note
*1: styrene-butadiene copolymer rubber, made by Japan Synthetic Rubber Co., Ltd.
*2 polybutadiene rubber, made by Japan Synthetic Rubber Co., Ltd.
*3: The cut growth resistance is expressed by an index on a basis that Comparative Example 5 is 100.

ratio) and total catalyst amount/isoprene=0.4/100 (weight ratio)] at mixing ratios of 3:10 and 8:5 (weight ratio) and drying them. The same procedure and measurement as described in Example 1 were repeated by using the two samples to obtain results as shown in the following Table 4.

TABLE 4

|  | Example 7 | Example 8 | Comparative Example 1 |
|---|---|---|---|
| Content of cis-1,4 bond (%) | 96 | 96 | 97 |
| Melting point (°C.) | 10 | 20 | 4 |
| Tetrahydrofuran insoluble matter (%) | 3.3 | 2.1 | 22 |
| Cut growth resistance (index) | 230 | 260 | 100 |
| Evaluation of shape | | | |
| log γ = 2.2 | 9 | 9 | 8.5 |
| = 3.5 | 9 | 9 | 7 |

From the results as mentioned above, it is understood that the rubber compositions according to the invention are excellent in the cut growth resistance, processability and dimensional stability and give well-balanced properties.

What is claimed is:

1. A rubber composition comprising:
   (a) not less than 20 parts by weight of polyisoprene having a melting point of not less than 10° C., a cis-1,4 bond content of not less than 88% and a tetrahydrofuran insoluble matter content of not more than 5% by weight; and
   (b) the balance thereof of at least one other rubber.

2. A rubber composition according to claim 1, wherein said polyisoprene has a melting point of not less than 15° C.

3. A rubber composition according to claim 2, wherein said melting point is not less than 20° C.

4. A rubber composition according to claim 2, wherein said melting point is not more than 40° C.

5. A rubber composition according to claim 1, wherein said polyisoprene is produced by polymerizing isoprene in the presence of a catalyst consisting of a combination of a compound of lanthanum series rare earth element; an organoaluminum compound; with Lewis acid, Lewis base or mixture thereof.

6. A rubber composition according to claim 1, wherein an amount of said polyisoprene is 30 to 90 parts by weight.

7. A rubber composition according to claim 1, wherein said other rubber is selected from the group consisting of natural rubber, polyisoprene rubber having a melting point of at most 4° C., styrene-butadiene copolymer rubber, polybutadiene rubber, ethylene-propylene copolymer rubber, ethylene-propylene-diene terpolymer rubber, acrylonitrile-butadiene copolymer rubber, butyl rubber and halogenated butyl rubber.

* * * * *